(No Model.)
A. M. FREEMAN.
BASKET.
No. 319,088. Patented June 2, 1885.
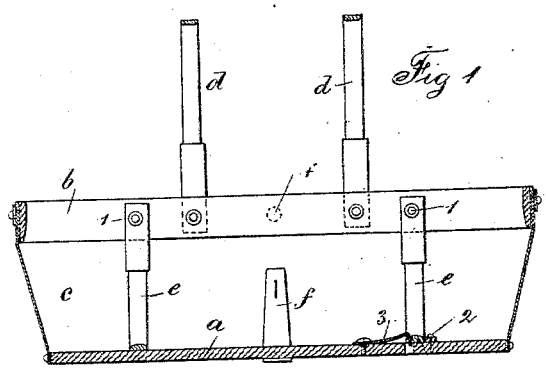
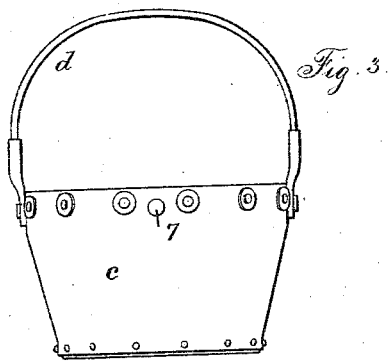
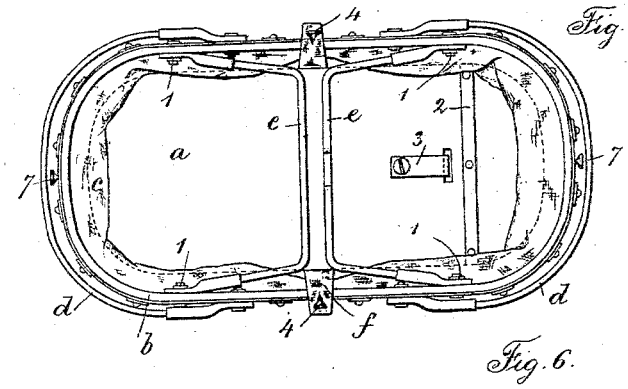
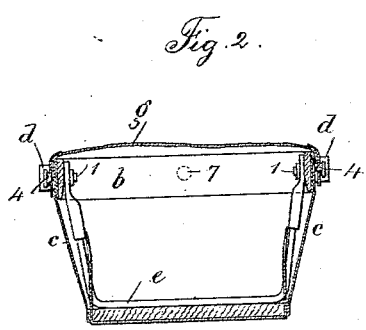
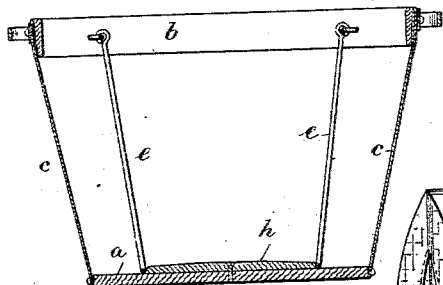
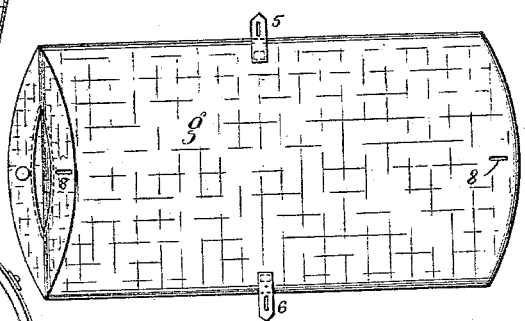
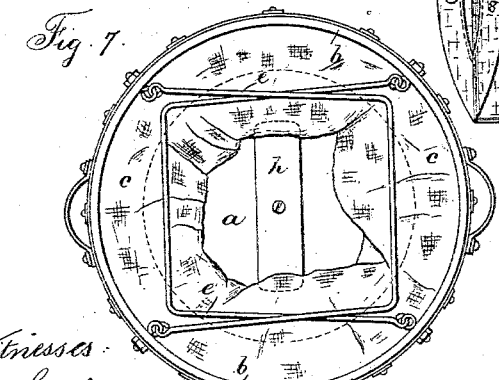
Witnesses:
J. Staib
Chas. H. Smith
Inventor:
Augustus M. Freeman
per Lemuel W. Serrell atty.
N. PETERS, Photo-Lithographer, Washington, D. C.

UNITED STATES PATENT OFFICE.

AUGUSTUS M. FREEMAN, OF OCEAN GROVE, NEW JERSEY, ASSIGNOR TO HIMSELF, AND JOHN I. HOLLY, OF NEW YORK, N. Y.

BASKET.

SPECIFICATION forming part of Letters Patent No. 319,088, dated June 2, 1885.

Application filed March 30, 1885. (No model.)

*To all whom it may concern:*

Be it known that I, AUGUSTUS M. FREEMAN, of Ocean Grove, in the county of Monmouth and State of New Jersey, have invented a certain Improvement in Baskets; and the following is declared to be a description of the same.

Folding or collapsible baskets have heretofore been made with flexible sides, and have been stretched to shape by a bail or handle connected to the upper rim of the basket, and extended down into the basket and bearing against the bottom of the same.

My invention relates to a folding or collapsible basket having flexible sides and pivoted stretchers for distending the same to shape, which stretchers are connected to the upper rim of the basket, and are independent of the handle or bails employed to carry the basket; and my invention further relates to a device upon the bottom of the basket for locking the stretchers when the basket is distended for use, and to a cover for the basket made of a double thickness of flexible material adapted to be buttoned or similarly fastened upon the top rim, said cover serving as a receptacle for the basket when collapsed and in a flat form.

In the drawings, Figure 1 is a longitudinal section of the basket. Fig. 2 is a cross-section. Fig. 3 is an end view. Fig. 4 is a plan of the basket collapsed. Fig. 5 is a plan of the flexible cover. Fig. 6 is a section, and Fig. 7 a plan view as collapsed, of a deep basket with handles at the ends, adapted to clothes and similar articles.

The basket is composed of the bottom $a$, of wood or similar material, frame or rim $b$, and the flexible material $c$, which forms the sides, the parts being secured by rivets or similar means, so as to connect the bottom and frame or rim together.

The handles $d$, Figs. 1, 2, and 4, are pivoted at their ends to the frame or rim $b$, and when folded down come outside said rim $b$.

The bottom $a$, frame $b$, and handles $d$ are preferably made of wood, but may be of metal, if desired.

The swinging stretchers $e$ are pivoted upon the frame or rim $b$ at 1, and are employed to distend the basket; and it is preferable to lock and hold one of said bails by the rib 2 and spring-catch 3 upon the bottom of the basket, between which the stretcher is received when the basket is distended. Both bails $e$ may be held in a similar manner; but it is not essential. These bails are preferably made of wood, and when the basket is collapsed they fold, preferably, inward toward the center.

There are straps $f$, of flexible material, secured to the bottom of the basket upon the inside, and when said basket is collapsed these straps can be turned over the frame $b$ and buttoned upon the knobs 4 to hold the parts in position.

I provide a cover, $g$, of flexible material, and I prefer to make the same double, as shown in Fig. 5, and I place straps 5 6 upon the sides and button-holes 8 at the ends, and said cover is secured upon the basket by buttoning upon the knobs 4 and 7, and this cover is of such a size that when the basket is in a collapsed form it may be placed inside the cover $g$ and the open end closed. In this condition the collapsed basket can be carried from place to place, and when it is to be used it is removed from said cover and distended by the stretchers $e$ to shape.

Figs. 6 and 7 show a deep basket suitable for clothes, in which there is also a bottom, $a$, frame $b$, flexible sides $c$, and stretchers or U-braces $e$, and when this basket is distended the pivoted strip $h$ upon the bottom $a$ is given a quarter-turn, and its ends are brought against the sides of the stretchers $e$ to hold the same in place.

This basket may be provided with a flexible cover to be secured upon the basket in the same manner as heretofore described, said cover being used in like manner as a receptacle for the collapsed basket. The handles are shown at the ends.

I claim as my invention—

1. The combination, in a collapsible basket, with the bottom $a$, frame $b$, and flexible sides $c$, of the stretchers $e$, pivoted at 1 upon the frame, the rib 2, and spring-catch 3, and the separate handles $d$, substantially as set forth.

2. The combination, in a collapsible basket, with the bottom $a$, frame $b$, separate handles $d$, and flexible sides $c$, of the stretchers $e$, the straps $f$, the cover $g$, and the straps and button-holes in said cover, and the knobs 4 7, whereby the cover on the frame $b$ can be secured upon the basket, substantially as specified.

3. In combination with a collapsible basket, a cover, $g$, in the form of a bag of flexible material, and adapted to be fastened upon the basket and to receive the basket in a collapsed condition, substantially as set forth.

4. The combination, in a collapsible basket, with the bottom $a$, frame $b$, and flexible sides $c$, of the stretchers $e$, and a stop upon the bottom of the basket to hold the braces $e$ when the basket is distended, substantially as set forth.

Signed by me this 24th day of March, A. D. 1885.

AUGUSTUS M. FREEMAN.

Witnesses:
GEO. T. PINCKNEY,
WILLIAM G. MOTT.